March 3, 1931.  A. S. HONTZ  1,794,958
ANIMAL TRAP
Filed May 28, 1930  2 Sheets-Sheet 1
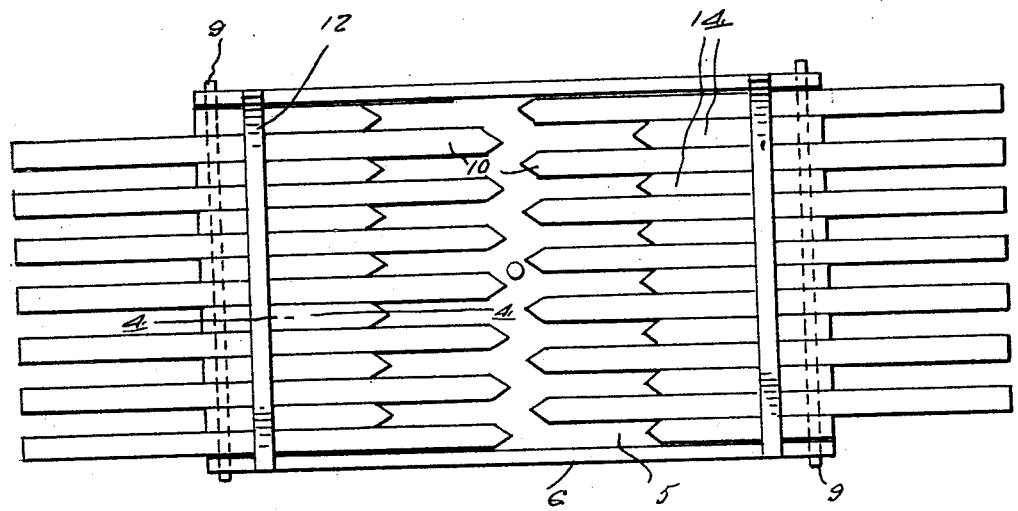
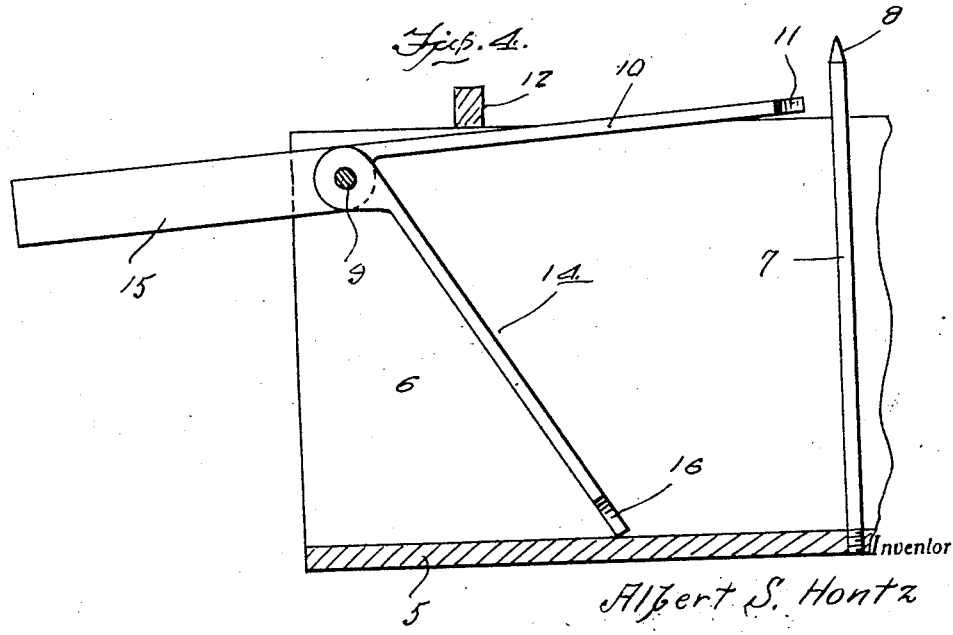
Inventor
Albert S. Hontz
By Clarence A. O'Brien
Attorney March 3, 1931.　　A. S. HONTZ　　1,794,958
ANIMAL TRAP
Filed May 28, 1930　　2 Sheets-Sheet 2
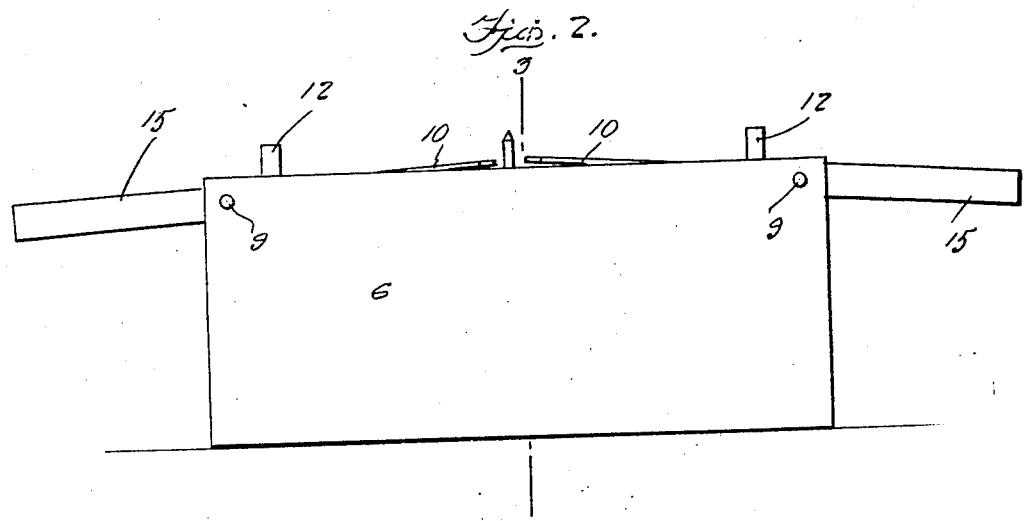
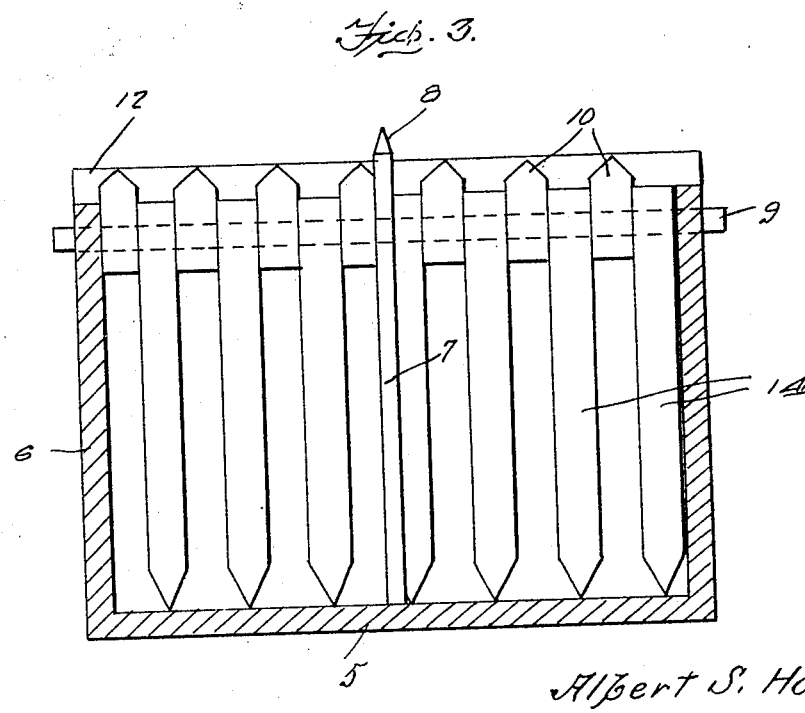
Inventor
Albert S. Hontz
By Clarence A. O'Brien
Attorney Patented Mar. 3, 1931

1,794,958

UNITED STATES PATENT OFFICE

ALBERT S. HONTZ, OF MAINVILLE, PENNSYLVANIA

ANIMAL TRAP

Application filed May 28, 1930. Serial No. 456,656.

The present invention relates to an animal trap and has for its prime object to provide a structure which is simple, inexpensive to manufacture, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a top plan view of the trap embodying the features of my invention,

Figure 2 is a side elevation thereof,

Figure 3 is a vertical transverse section therethrough taken substantially on the line 3—3 of Figure 2, and Figure 4 is a vertical longitudinal section taken substantially on the line 4—4 of Figure 1.

Referring to the drawing in detail it will be seen that the body or casing like portion of the trap is made up of a bottom 5 with side walls 6 rising therefrom so that the same is open at the ends and at the top. A base spike 7 is threadedly engaged in the center of the bottom 5 to rise therefrom terminating a slight distance above the upper edge of the side walls 6 in a point 8.

A pair of rods 9 are disposed between the side walls 6 in the adjacent upper corners thereof. A plurality of fingers 10 are rockable on the rods 9 in spaced relation to each other and terminate in points 11. The fingers on one rod are alternately disposed in respect to the fingers on the other rod as clearly apparent from Figure 1.

Bars 12 are fixed to the fingers 10 adjacent the rod 9 and the ends of the bars 12 rest on the upper edges of the side 6 and hold the fingers 10 in an upwardly and inwardly inclined position. A plurality of angular members are rockably mounted on the rods 9 being alternately arranged with respect to the fingers 10. Each angular member comprises a finger 14 obliquely disposed to arm 15. The fingers 14 are sufficiently heavy to normally have their pointed ends 16 in abutment with the bottom so as to incline downwardly and inwardly from the rods 9 with the arms 15 projecting outwardly from the end of the casing like body.

Now with bait on the spike 7 the animal approaches through one end of the casing like body and easily swings up the fingers 14 which will drop down behind the animal and trap him in the casing like member so that it is impossible for the animal to successfully escape because should he jump upwardly he would merely strike against the fingers 10 should he attempt to escape between the two sets of fingers 10 he would be unsuccessful and in withdrawing would spike himself because of the pointed ends 11. The animal after having been killed may be easily removed from the trap by swinging up the fingers 10 as will be apparent.

It is thought that the construction, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, in the combination and arrangement of parts may be resorted to without departing from the spirit or scope of the invention as hereinafter claimed or sacrificing any of its advantages.

Having thus described my invention, what I claim as new is:

1. A trap of the class described comprising a casing like body having an open end, an open top, rods one at each end of the body adjacent the upper corner thereof, fingers rockable on the rods, bars across the fingers resting on the sides of the body to hold the fingers extending inwardly, angular members rockable on the rods between the fingers, each angular member including an arm and a finger obliquely disposed therefrom and sufficiently heavy to normally have its end in abutment with the bottom of the body inclining inwardly and downwardly from its respective rod.

2. A trap of the class described comprising a casing like body having an open end, an open top, rods one at each end of the body adjacent the upper corner thereof, fingers rockable on the rods, bars across the fingers resting on the sides of the body to hold the fingers extending inwardly, angular members rockable on the rods between the fingers, each angular member including an arm and a finger obliquely disposed therefrom and sufficiently heavy to normally have its end in abutment with the bottom of the body inclining inwardly and downwardly from its respective rod, the ends of the fingers being pointed.

3. A trap of the class described comprising a casing like body having an open end, an open top, rods one at each end of the body adjacent the upper corner thereof, fingers rockable on the rods, bars across the fingers resting on the sides of the body to hold the fingers extending inwardly, angular members rockable on the rods between the fingers, each angular member including an arm and a finger obliquely disposed therefrom and sufficiently heavy to normally have its end in abutment with the bottom of the body inclining inwardly and downwardly from its respective rod, the ends of the fingers being pointed, a base spike rising from the bottom of the body and extending up between the ends of the first mentioned fingers.

In testimony whereof I affix my signature.

ALBERT S. HONTZ.